United States Patent [19]

Endo et al.

[11] Patent Number: 4,562,163

[45] Date of Patent: Dec. 31, 1985

[54] BORON NITRIDE COMPLEX AND PROCESS FOR ITS PREPARATION, AND PROCESS FOR PREPARING A LIGHT-TRANSMITTING DENSE BODY OF CUBIC SYSTEM BORON NITRIDE

[75] Inventors: Tadashi Endo; Tadao Sato; Osamu Fukunaga, all of Sakura, Japan

[73] Assignee: National Institute for Researches in Inorganic Materials, Ibaraki, Japan

[21] Appl. No.: 532,093

[22] Filed: Sep. 14, 1983

[30] Foreign Application Priority Data

Sep. 27, 1982 [JP] Japan .................................. 57-168082
Sep. 27, 1982 [JP] Japan .................................. 57-168083

[51] Int. Cl.$^4$ ...................... C04B 35/58; C01B 21/064
[52] U.S. Cl. .................................... 501/96; 423/290
[58] Field of Search ........................... 501/96; 423/290

[56] References Cited

U.S. PATENT DOCUMENTS 3,701,826 10/1972 De Vries et al. .................... 423/290
4,287,164 9/1981 Endo et al. ......................... 423/290
4,361,543 11/1982 Zhdanovich et al. ............... 423/290
4,409,193 10/1983 Sato et al. .......................... 423/290

Primary Examiner—Howard S. Williams
Attorney, Agent, or Firm—Oblon, Fisher, Spivak, McClelland & Maier

[57] ABSTRACT

A boron nitride complex comprising hBN in which lithium or an alkaline earth metal is diffused and supported in the form of its boron nitride. The boron nitride complex is prepared by heating hBN powder or a sintered product thereof and lithium, an alkaline earth metal, a lithium nitride or boride, or an alkaline earth metal nitride or boride in a non-oxidizing atmosphere to diffuse in and deposit on hBN powder or sintered product thereof, the lithium or alkaline earth metal in the form of its boron nitride. Also disclosed is a process for preparing a light-transmitting dense body of cubic system boron nitride, which comprises diffusing in and depositing on a sintered product of hexagonal system boron nitride, from 0.15 to 3.0 molar % of $Me_3B_2N_4$ where Me is an alkaline earth metal, and sintering the $Me_3B_2N_4$-containing product thereby obtained, at a temperature of at least 1350° C. under a thermodynamically stable pressure for cubic system boron nitride.

4 Claims, 5 Drawing Figures

FIGURE 2
FIGURE 3
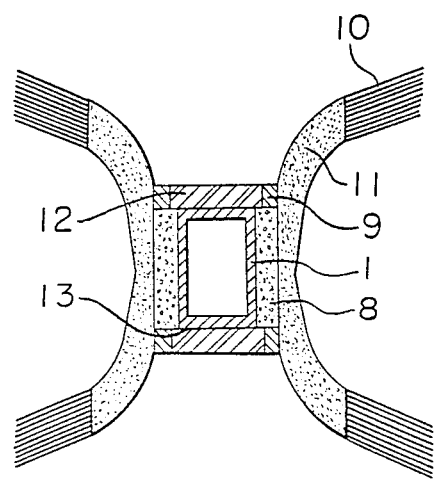
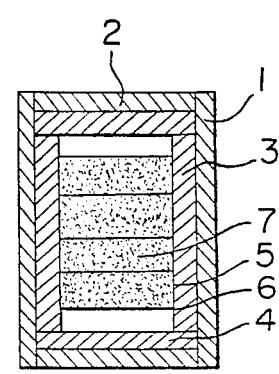

BORON NITRIDE COMPLEX AND PROCESS FOR ITS PREPARATION, AND PROCESS FOR PREPARING A LIGHT-TRANSMITTING DENSE BODY OF CUBIC SYSTEM BORON NITRIDE

BACKGROUND OF THE INVENTION

1. Field of the Invention

The present invention relates to a boron nitride complex and a process for its preparation and a process for preparing a light-transmitting dense body of cubic system boron nitride. In the present invention, the boron nitride complex is meant for boron nitride in which lithium or an alkaline earth metal is diffusely supported in the form of its boron nitride.

2. Description of the Prior Art

When a catalyst is used for a chemical reaction, it is common that a catalytically active substance is fixed or supported on a solid carrier to enlarge the effective surface area of the catalytically active substance, to ensure the uniform reaction, to prevent the catalyst from flowing away or to increase the recovery rate of the catalyst. A number of such catalyst systems have been known so far.

Hexagonal system boron nitride (hereinafter referred to as "hBN") is a chemically stable solid having a layered structure similar to the structure of graphite. However, it has not been known to employ such boron nitride as a carrier for supporting lithium or an alkaline earth metal.

Heretofore, as a process for the synthesis of cubic system boron nitride (hereinafter referred to as "cBN"), it has been known to mix hBN with an alkali metal or alkaline earth metal nitride or boron nitride and treat the mixture under a high temperature and pressure.

Further, the present inventors have previously developed a process for the production of a sintered body of cBN which comprises mixing hBN with magnesium boron nitride, and sintering the mixture under a high temperature and pressure (Japanese Patent Application No. 57549/1982).

In these conventional processes, the mixing with the alkali metal or alkaline earth metal boron nitride is conducted by a mechanical means. By such mechanical mixing, it is difficult to uniformly distribute the alkali metal or alkaline earth metal boron nitride with high dispersibility to hBN. Besides, the alkali metal or alkaline earth metal boron nitride (except for magnesium boron nitride) is highly reactive with moisture, and accordingly, if the mixing operation is conducted for an extended duration to ensure uniform mixing, it is likely to react with moisture and lose its catalytic activity and thus tends to degrade the quality of the product thereby obtained. Therefore, it is thereby impossible to obtain cBN having a high quality. Although it is possble to obtain a light-transmitting sintered product of cBN, the product usually has cloud-like or spot-like haze and a yellow color and it is unsatisfactory in its quality.

Cubic system boron nitride (cBN) having a zinc-blende structure has hardness comparable to diamond, and is thermally and chemically more stable than diamond. By virtue of these superior properties and reflecting the recent trend for automation or saving of man power for the operation of machining tools by means of computer control and the like, cBN has been recognized as a prospective material suitable for highly efficient and precise tools. Particularly, cBN is known to provide excellent performance in the processing of iron-family materials such as high speed steel, die steel, cast iron and sintered hard alloys. Further, cBN has promising properties for use as electronic materials and optical materials. Therefore, it is desired to develop the technologies for the production of a sintered body of cBN having a high purity and density, as well as its single crystal.

For the production of a sintered product of cBN, the following methods have been known:

(1) A method in which hBN having various characteristics such as the particle size, crystallinity and the structural specificity is used as the starting material, and it is treated under a high temperature and high pressure condition. (e.g. Japanese Examined Patent Publication No. 17520/1977)

(2) A method in which hBN is activated by pretreatment such as reduced pressure treatment, and the activated hBN is used as the starting material. (Japanese Unexamined Patent Publication No. 167110/1980)

However, the sintered products of cBN obtainable by these methods are grayishly translucent or blackishly opaque and cannot yet be recognized as a highly hard dense body wherein cBN particles are directly bonded to one another.

The present inventors have earlier developed a process for producing a light-transmitting dense product of cBN which comprises mechanically mixing hBN or a mixture of hBN and cBN with from 0.15 to 3.0 molar % of $Me_3B_2N_4$ where Me is an alkaline earth metal, and sintering the mixture thus obtained as a starting material under high pressure. (Japanese Patent Application No. 57549/1982)

As mentioned above, however, the sintered product of cBN obtainable from a mechanically mixed starting material is not totally satisfactory in its quality.

SUMMARY OF THE INVENTION

Accordingly, it is an object of the present invention to provide a boron nitride complex wherein a lithium or alkaline earth metal boron nitride is uniformly distributed in boron nitride, and a process for preparing such a boron nitride without relying on mechanical mixing. Boron nitride herein described means the compound composed of boron and nitrogen such as hBN, amorphous BN and so forth.

Another object of the invention is to provide a process for preparing a light-transmitting dense body of cBN having improved qualities such as high purity, high density and high hardness.

The present inventors have found that when lithium, an alkaline earth metal or a nitride or boron nitride of lithium or an alkaline earth metal, is heated in a non-oxidizing atmosphere in contact with or without hBN powder or its sintered product, it diffuses and will be uniformly distributed in hBN, and a lithium or alkaline earth metal boron nitride will be formed on and supported in hBN.

Thus, the present invention provides a boron nitride complex comprising hBN and lithium boron nitride or an alkaline earth metal boron nitride.

Further, the present inventors have found that when a sintered product of hBN in which from 0.15 to 3.0 molar % of $Me_3B_2N_2$ is diffused in the above manner, is sintered, it is possible to obtain a light-transmitting dense body of cBN having an improved purity, high density and high hardness, and it is also possible to obtain such a dense body which is colourless and transparent.

Thus, the present invention also provides a process for preparing a light-transmitting dense body of cBN, which comprises diffusing in and depositing on a sintered product of hBN, from 0.15 to 3.0 molar % of $Me_3B_2N_4$, and sintering the $Me_3B_2N_4$-containing product thereby obtained, at a temperature of at least 1350° C. under a thermodynamically stable pressure for cBN.

BRIEF DESCRIPTION OF THE DRAWINGS

In the accompanying drawings,

FIG. 2 is a cross-section illustrating a belt-type high pressure device.

FIG. 3 is a longitudinal cross-section showing the cell assembly.

DETAILED DESCRIPTION OF THE PREFERRED EMBODIMENTS

Figure 1:
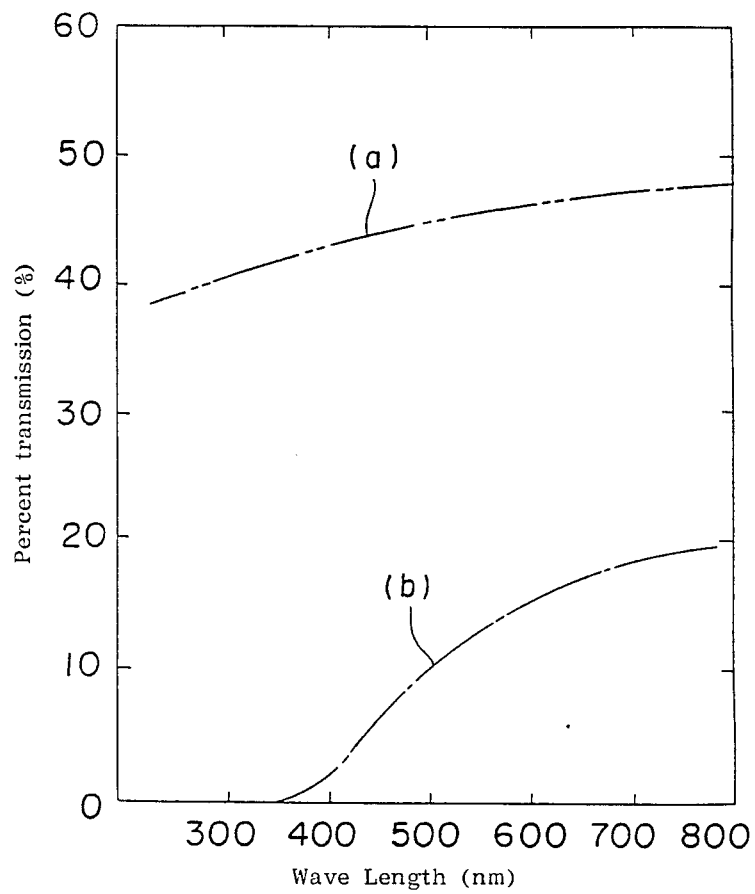
FIG. 1 is a graph illustrating the percent transmission of a sintered product of cBN obtained from a boron nitride complex of the present invention (a) and that of a sintered product of cBN obtained from a mechanically mixed material comprising hBN powder and magnesium boron nitride (b).

In a preferred embodiment for the preparation of the boron nitride complex of the present invention, hBN powder or sintered product thereof and the lithium, alkaline earth metal, lithium nitride or boride, or alkaline earth metal nitride or boride, are heated in contact with each other in a non-oxidizing atmosphere. In another preferred embodiment, hBN powder or sintered product thereof is placed in a crucible, and the lithium, alkaline earth metal, lithium nitride or boride, or alkaline earth metal nitride or boride placed outside the crucible is heated to diffuse from outside the crucible into the crucible in a non-oxidizing atmosphere, whereby the diffused lithium or alkaline earth metal will deposit on the hBN powder or sintered product thereof in the form of its boron nitride.

For instance, in a crucible made of molybdenum, lithium or an alkaline earth metal such as Mg, Ca, Ba or Sr, is placed, and hBN powder or its sintered product is embedded therein, whereupon the crucible is heated.

Commercial hBN products usually contain a few percent of oxygen in the form of e.g. $B_2O_3$, which causes a deterioration of the catalytic activity of lithium or the alkaline earth metal. Accordingly, it is desirable to adequately remove the oxide from the starting hBN material before use for the preparation of the sintered body of cBN.

Likewise, when the sintered product of hBN is used, impurities such as oxygen and carbon should be removed before use. For instance, such impurities may be removed by heating the sintered product of hBN at a temperature of 2100° C. by using a graphite heater, followed by similar heating in a molybdenum heater. Further, the sintered product of hBN is preferably porous (e.g. a porosity of about 14%), and its particle size is preferably as small as possible because if the size is excessively large, it takes a long duration to uniformly diffuse and distribute lithium or an alkaline earth metal boron nitride into the sintered product.

The particle size of the powder of an alkaline earth metal such as magnesium (hereinafter magnesium will be referred to as a typical example of the alkaline earth metal for the sake of convenience of the description) is not critical. However, if the particle size is excessively large, the spaces between the magnesium particles become large, and consequently the vapor phase components expected to penetrate into the hBN powder or its sintered product tend to scatter out of the crucible, such being undesirable. On the other hand, if the particles are too fine, a high purity product is hardly obtainable and an adverse effect of the magnesium oxide tends to be pronounced. Therefore, the particle size is preferably about 1 mm.

The material of the heating furnace may be any material so long as it does not react with magnesium or its nitride or boride. For instance, molybdenum may be used as the heating element and heat reflector.

The heating atmosphere is required to be a non-oxidizing atmosphere. Otherwise, it is impossible to obtain a boron nitride complex of the present invention. When magnesium is a metallic single substance, it is necessary to use a nitrogen or ammonia atmosphere.

For the production of the boron nitride complex, the furnace is vacuumed to adequately remove the air in advance, and e.g. nitrogen gas is introduced to establish a nitrogen atmosphere, whereupon the heating is conducted by e.g. high frequency induction heating. The temperature is stepwise raised. Namely, the temperature is maintained at 640° C. for 2 hours, then at 800° C. for 5 hours and further at 1150° C. for 5 hours, whereupon a BN complex is obtained. The rapid increase of temperature brings about abrupt melting (melting point: 650° C.) and evaporation (boiling point: 1150° C.) of magnesium, and tends to lead to the formation of fine magnesium boron nitride film on the surface of the sintered product, whereby uniform diffusion of the magnesium into the sintered product will be disturbed. Accordingly, it is desirable that magnesium is in a stabilized state at a temperature at which magnesium can adequately penetrate and diffuse into BN. The above-mentioned steps for maintaining the temperature at 640° C. and 800° C. are intended to stabilize magnesium in the form of its nitride. In this sense, it is preferred to use magnesium nitride or magnesium boron nitride rather than magnesium metal.

The temperature for the final heating is selected depending upon the particular purpose of the BN complex taking into accounts the desired content and concentration of the magnesium boron nitride and the uniformity of its distribution. The final heating temperature is usually from 1000° to 1300° C. For instance, to obtain a product useful for the preparation of a transparent sintered body of cBN, the final heating is conducted at 1150° C. for 5 hours, whereby a BN complex of magnesium-containing boron nitride having adequate properties is obtainable.

In the case that the hBN powder or its sintered product is fine, if it is heated in contact with magnesium powder, it will be difficult to separate the BN complex product from the remaining magnesium nitride powder. In such a case, the hBN powder or the hBN sintered powder is placed in a crucible, and the crucible is placed in another crucible containing magnesium, whereupon the heating is conducted in the above-mentioned manner. Then, the BN complex can readily be separated. The crucible into which the hBN powder or the hBN sintered product is placed, is required to be free from a reaction with hBN and lithium or an alkaline earth metal such as magnesium and from a trouble of being decomposed when heated. The wall of the crucible is preferably porous so that magnesium or the like can readily be diffused. For instance, a crucible made of a sintered product of hBN or a metal crucible made of e.g. molybdenum may be used. The crucible made of a sintered product of hBN reacts with magnesium nitride to partially form magnesium boron nitride. However, the crucible does not thereby loose its original shape, and its function will not be impaired. In the case of the metal crucible such as a molybdenum crucible, one end is opened or a porous lid is used for diffusion.

This method is advantageous over the direct contact method in that a product having a more uniform distribution of e.g. magnesium is obtainable, and it is particularly advantageous in the case where a low concentration distribution is desired.

In the case where lithium or an alkaline earth metal other than magnesium is used, a BN complex can be obtained substantially in the same manner. However, it is desirable that the melting point, boiling point and reactivity of the respective elements are taken into account. For instance, lithium has a melting point as low as 279° C. and is highly reactive, and it is rather difficult to handle it. Accordingly, it is preferably used in the form of lithium nitride or lithium boron nitride. The same applies to Ca, Ba or Sr.

The lithium or alkaline earth metal in the BN complex is supported mainly in the form of its boron nitride such as $Mg_3B_2N_4$, $Ca_3B_2N_4$, $Ba_3B_2N_4$, $Sr_3B_2N_4$ or $Li_3BN_2$.

The BN complex of the present invention is useful as the starting material for the synthesis of cBN or as a starting material for a sintered body of cBN. Particularly, it is useful to obtain a transparent sintered body of cBN.

FIG. 1 shows the percent transmission in the case where the conventional mechanical mixing is employed and the percent transmission in the case where the BN sintered product of the present invention is used. Namely, in the Figure, curve (a) represents the percent transmission of the sintered body of cBN obtained by using the BN complex in which magnesium boron nitride is diffused and supported according to the process of the present invention, and curve (b) is the percent transmission of the sintered body of cBN obtained by using a mixture obtained by mechanically mixing hBN powder and magnesium nitride. Namely, the percent transmission represented by the curve (a) is higher by about 4 times than the percent transmission represented by the curve (b) in the visual region.

Now, the process for the preparation of a light-transmitting dense body of cubic system boron nitride according to the present invention will be described.

The process is characterized in that from 0.15 to 3.0 molar % of $Me_3B_2N_4$ is diffused into a sintered product of hBN, and the $Me_3B_2N_4$-containing product is then sintered at a temperature of at least 1350° C. under a thermodynamically stable pressure for cBN.

The sintered product of hBN as the starting material is preferably of a high purity. For instance, a commercially available high purity sintered product of hBN (a product usually obtained by sintering hBN powder by means of a hot press method at a temperature of from 1700° to 2000° C. under pressure of from 350 to 1700 kg/cm²) is preliminarily baked in nitrogen gas at a temperature of 2100° C. for 2 hours to obtain a material having an oxygen content of not greater than 0.3% by weight.

Then, $Me_3B_2N_4$ is diffused into the high purity sintered product of hBN thus obtained.

The following methods may be employed for the diffusion.

(1) A method in which $Me_3B_2N_4$ or $Me_3N_2$ is brought into contact with a sintered product of hBN and reacted and diffused in a nonoxydizing atmosphere.

(2) A method wherein a sintered product of hBN is placed in a crucible made of hBN to avoid direct contact with $Me_3B_2N_4$ and is subjected to a vapor phase diffusion in nitrogen gas.

The method (1) is convenient from the viewpoint of the control of the diffusing conditions (i.e. the temperature and time).

Having thus diffusing $Me_3B_2N_4$ into the sintered product of hBN, $Me_3B_2N_4$ is highly dispersed and distributed in the sintered product of hBN. Accordingly, a sintered product of cBN obtained by treating this material under a high temperature and high pressure condition is highly pure and has an improved quality and uniform structure, and presents an excellent light-transmitting property. Further, $Me_3B_2N_4$ such as $Ca_3B_2N_4$ is susceptible to hydrolysis in air. However, this material is supported in the sintered product of hBN, whereby it can be handled in air when it is filled in a high pressure reactor, such being extremely advantageous.

The proportion of $Me_3B_2N_4$ to be distributed into the sintered product of hBN is required to be from 0.15 to 3.0 molar %. If the proportion is less than 0.15 molar %, no adequate effectiveness is obtainable. On the other hand, if the proportion exceeds 3.0 molar %, the excessive amount of $Me_3B_2N_4$ will remain at the intergranular boundaries of the sintered product, or a local abnormal grain growth is likely to take place, whereby a satisfactory sintered body will be hardly obtainable. In order to obtain a sintered body having a good light-transmitting property, the proportion should preferably be from 0.15 to 1.8 molar %.

The sintering must be conducted at a temperature of at least 1350° C. and under a thermodynamically stable pressure condition for cBN. The pressure value is estimated on the basis of the load-pressure curve grown with the phase transitions of bismuth, thallium and barium at room temperature that are given at 2.55, 3.7 and 5.5 GPa, respectively. The temperature is measured by means of a thermocouple made of platinum-platinum/rhodium (13%), and controlled by the electric power applied to the graphite heater.

Figure 5:
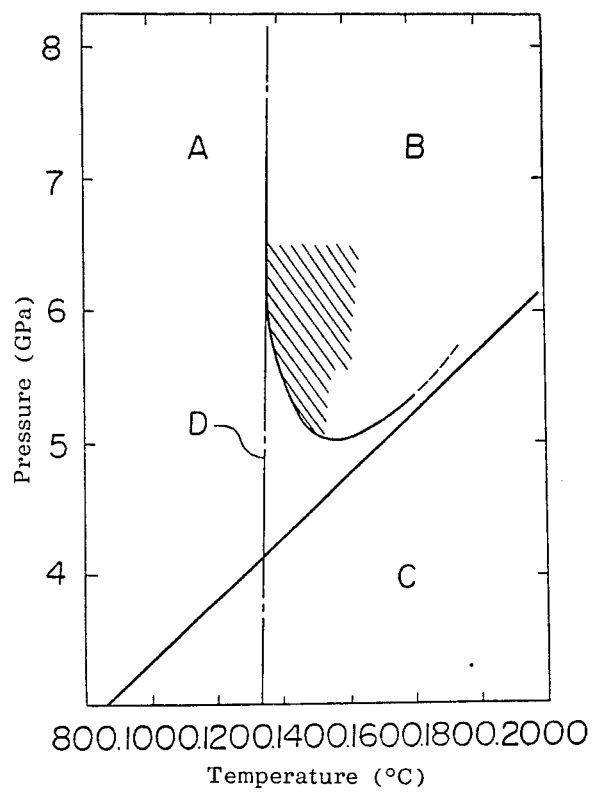
FIG. 5 shows the temperature-pressure conditions in the region where cBN can be synthesized.

FIG. 5 shows the temperature-pressure conditions in the region where cBN can be synthesized. In the Figure, A and B denote the thermodynamically stable regions for cBN, B denotes the region where cBN can be synthesized (when $Me_3B_2N_4$ is used), C denotes the thermodynamically stable region for hBN, and D denotes an eutectic line of $Me_3B_2N_4$ and BN. In the present invention, the synthesis is conducted in the shaded portion of the region B.

In the process of the present invention, e.g. a belt-type high pressure device as shown in FIG. 2 is used. FIG. 2 is a longitudinal cross-section of cell assembly in the belt-type high pressure device. In the Figure, a reference numeral 8 designates a cylinder of sodium chloride as a pressure applying medium, which is in a molten or semi-molten state under the temperature-pressure condition for the formation of a sintered body of cBN. Reference numeral 1 designates a graphite heater, numeral 10 designates a paper gasket, numeral 11 designates a pyrophyllite gasket, numeral 12 designates a $ZrO_2$ thermal insulation disc, numeral 13 designates molybdenum plate and numeral 9 designates a current ring.

Alternating current or direct current power is supplied to the graphite heater 1 from the top and bottom anvils through the current ring 9 and the molybdenum plate 13. Such high pressure and high temperature generating device may be of any type so long as it is capable of maintaining the operating conditions throughout the duration required for producing a sintered body of cBN.

According to the process of the present invention, since a sintered product of hBN contains a specific amount of diffused $Me_3B_2N_4$ as the starting material, a dense body of cBN having a uniform quality and composition as well as a superior light-transmitting property can be readily obtained. Further, the operation for the high temperature and high pressure tests can be conducted simply in air, and an adverse effect due to the inclusion of impurities during the process of the preparation is extremely small.

Now, the present invention will be described in further detail with reference to Examples.

EXAMPLE 1

In a crucible made of molybdenum, magnesium particle powder was placed, and several tens of sintered hBN pieces (5 mm$\phi$, thickness: 1 mm) were embedded. The crucible was set in a high frequency induction heating furnace. The furnace was preliminarily vacuumed to remove air, and then nitrogen gas was supplied to establish a nitrogen atmosphere. The temperature in the furnace was gradually raised, and it was maintained at 640° C. for 2 hours, then 800° C. for 2 hours and further at 1150° C. for 5 hours.

Then, the furnace was cooled to room temperature, and the sintered hBN pieces were taken out. The magnesium nitride powder deposited on the pieces was removed. The magnesium-containing BN complex thus obtained was covered with a brown layer rich in $Mg_3B_2N_4$ having a thickness of about 0.1 mm, and its interior was light yellow or light green. From the EPMA analysis of the interior, it was confirmed that magnesium is continuously distributed in a concentration of from 0.1 to 0.5% by weight, and from the X-ray diffraction pattern, the origin of magnesium was identified as $Mg_3B_2N_4$.

EXAMPLE 2

With use of magnesium nitride particle powder instead of the magnesium particle powder, samples having the same composition as in Example 1 were heated. The temperature was gradually raised, and it was maintained at 1150° C. for 5 hours. In the same manner as in Example 1, a BN complex was prepared. The BN complex thereby obtained was substantially the same as in Example 1.

EXAMPLE 3

A hBN crucible containing hBN powder and a sintered hBN product, was embedded in magnesium nitride powder contained in a crucible made of molybdenum, and heated at 1200° C. for 5 hours in a nitrogen stream. A BN complex thus obtained contained about 0.2% by weight of magnesium. According to this method, no brown layer was observed on the surface of the BN complex, as opposed to Examples 1 and 2.

EXAMPLE 4

A crucible made of molybdenum and containing hBN powder or a sintered hBN product, was placed in a crucible made of molybdenum and containing magnesium nitride powder. After placing a lid, the heating was conducted in the same manner as in Example 3, whereby a BN complex was obtained.

EXAMPLE 5

BN complexes in which lithium boron nitride and calcium boron nitride were respectively diffused and supported, were prepared in the same manner as in Example 2 except that lithium nitride and calcium nitride were respectively used instead of magnesium nitride in Example 2.

EXAMPLE 6

A high purity sintered hBN product having a bulk density of 1.9 g/cm$^3$ was treated in a nitrogen gas atmosphere at a temperature of 2100° C. for 2 hours. From the results of the radioactive chemical analysis, the remaining oxygen in the sintered product was not greater than 0.1% by weight. Then, preliminarily prepared $Mg_3B_2N_4$ powder was brought in contact with this sintered hBN product, and heated in a nitrogen gas atmosphere at 1160° C. for about 5 hours. The product thereby obtained was examined by a chemical analysis by means of EPMA and by a powder X-ray diffraction method, whereby it was found that 0.6 molar % of $Mg_3B_2N_4$ was uniformly distributed in the interior of the sintered hBN product.

This product was used as the starting material. FIG. 3 is a longitudinal cross-section of a specimen construction to be subjected to the high temperature and high pressure sintering. A reference numeral 1 designates a graphite heater, a numeral 2 designates a graphite disc, a numeral 3 designates a sodium chloride cylinder and a numeral 4 designates a sodium chloride disc. In such a specimen construction, a molybdenum reactor comprising a molybdenum cylinder 5 and a molybdenum plate 6 is inserted, and starting materials 7 were piled and packed.

By means of a belt-type high pressure device as shown in FIG. 2, this assembly was maintained at 1550° C. under 5.7 GPa for about 30 minutes, then rapidly cooled to a room temperature and taken out. The molybdenum reactor was removed by treating it with hot aqua regia, whereby a dense body was obtained. This dense body was colorless and transparent.

Figure 4:
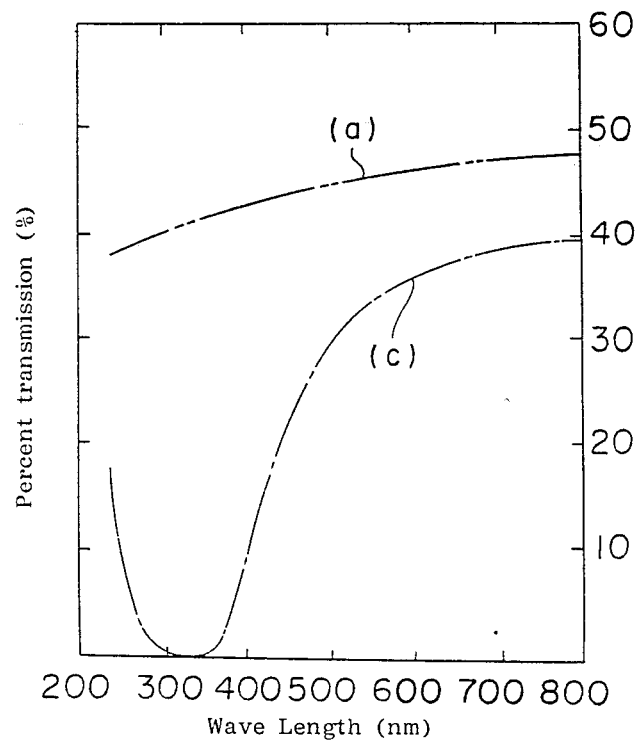
FIG. 4 is a graph showing the absorption spectra of light-green transmitting dense bodies of cBN according to the present invention (c).

From the chemical analysis of the outer surface and the fracture surface of this dense body, it was found that the dense body was a single phase of cBN containing no impurities. The density was in agreement with the theoretical value, and the micro-indentation hardness was as high as at least 5700 kg/mm$^2$. The percent transmission of the dense body having an outer diameter of 6.7 mm and a thickness of 0.7 mm in the visible ultraviolet region (250–800 nm) was as shown by line (a) in FIG. 4.

EXAMPLE 7

The same sintered hBN product as used in Example 6 was brought in contact with $Mg_2N_3$ powder, and heated in a nitrogen atmosphere at 1250° C. for about 7 hours. The product thereby obtained was a sintered hBN containing 1.5 molar % of diffused $Mg_3B_2N_4$. This product was used as the starting material and treated at 1400° C. under 5.5 GPa for about 40 minutes in the same manner as in Example 6, whereby a dense body was obtained. This dense body was light green, but was confirmed to be a sintered dense body of cBN having a uniform structure by the observation by means of a optical microscope. The percent transmission of the dense body having an outer diameter of 6.5 mm and a thickness of 0.8 mm in the visible ultraviolet region (250–800 nm) was as shown by line (c) of FIG. 4.

EXAMPLE 8

With use of the same sintered hBN product as used in Example 6, $Sr_3B_2N_4$ was heated in a nitrogen gas atmosphere at 1100° C. for about 12 hours. The product thereby obtained was a yellowish sintered hBN product containing about 1.4 molar % of diffused $Sr_3B_2N_4$. By using this product, a specimen was constructed in the same manner as in Example 6. The specimen was maintained at 1510° C. under 5.2 GPa for 1 hour, and then gradually cooled, whereupon a dense body was obtained in the same manner as in Example 6. This dense body was a light-transmitting light green dense body of cBN. The micro-indentation hardness was extremely high with the value of about 6400 kg/mm².

Further, in addition to the above Examples, light-transmitting dense bodies of cBN were obtained by using $Ca_3B_2N_4$ and $Ba_3B_2N_4$, respectively.

What is claimed is:

1. A process for preparing a boron nitride complex, which comprises:
   (a) heating a mixture of hBN powder or a sintered product thereof and lithium, an alkaline earth metal, lithium nitride or boride or an alkaline earth metal nitride or boride in a non-oxidizing atmosphere at an elevated temperature concluding at a temperature of about 640° C. for a time sufficient to stabilize the material being heated;
   (b) further elevating the temperature to heat the material and concluding the heating step at a temperature of about 800° C. for a time to further stabilize the material being heated; and
   (c) elevating the temperature of heating to finally heat the material to a temperature within the temperature range of 1000° C. to 1300° C., thereby preparing said boron nitride complex.

2. A boron nitride complex prepared by the process of claim 1.

3. A process for producing a boron nitride complex, which comprises:
   (a) placing hBN powder or a sintered product thereof in a crucible;
   (b) placing lithium, an alkaline earth metal, lithium nitride or boride or an alkaline earth metal nitride or boride outside of said crucible; and
   (c) heating the materials of steps (a) and (b) in a non-oxidizing atmosphere, thereby causing the metal, nitride or boride of step (b) to deposit on and diffuse into the hBN powder or sintered product thereof in the form of its boron nitride.

4. The process of claim 3, wherein the material in said crucible is hexagonal system boron nitride, and wherein from 0.15 to 3.0 mole % of $Me_3B_2N_4$, wherein Me is an alkaline earth metal, is diffused into said hBN and the product obtained is sintered at a temperature of at least 1350° C. under a thermodynamically stable pressure for cubic system boron nitride.

* * * * *